April 21, 1970     L. K. ANDERSON ET AL     3,507,553
ULTRASONIC DIGITAL LIGHT DEFLECTOR
Filed July 6, 1967

INVENTORS *L. K. ANDERSON*
*S. S. DEVLIN*
BY
*Sylvan Sherman*
ATTORNEY.

United States Patent Office 3,507,553
Patented Apr. 21, 1970

3,507,553
ULTRASONIC DIGITAL LIGHT DEFLECTOR
Lawrence K. Anderson, Stirling, and Shaun S. Devlin, Morris Township, Morris County, N.J., assignors to Bell Telephone Laboratories, Incorporated, Murray Hill and Berkeley Heights, N.J., a corporation of New York
Filed July 6, 1967, Ser. No. 651,437
Int. Cl. G02f 1/28; H04b 9/00; H04n 3/00
U.S. Cl. 350—161                                                          6 Claims

ABSTRACT OF THE DISCLOSURE

This disclosure describes ultrasonic beam deflectors which employ a multimode acoustic resonator to achieve efficient digital deflection. In particular, the acoustic resonator is located between a transducer and a deflecting medium. In operation, the transducer is driven by a variable frequency oscillator, and, at the same time, a beam of radiation is directed upon the medium. When the transducer is driven at one of the resonance frequencies of the resonator, a portion of the beam is deflected through an angle proportional to the acoustic frequency. Since the resonance frequencies are equally spaced, they can be made to correspond to a plurality of adjacent addresses having equal angular separations. Other arrangements using this deflector are also described.

This invention relates to ultrasonic beam deflectors which employ a multimode acoustic resonator to achieve more efficient digital deflection.

BACKGROUND OF THE INVENTION

The discovery of materials having excellent acoustical and optical properties and having large photoelastic constants, coupled with advances in the fabrication of broadband acoustical transducers, has led to increasing interest in the use of acoustic devices in systems requiring optical beam control. (See E. I. Gordon, A Review of Acousto-optical Deflection and Modulation Devices, Applied Optics, p. 1629, October 1966.) For example, acoustooptical deflection devices are being considered for such applications as optical memories, optical switching systems, displays and light modulation.

Ultrasonic beam deflectors typically comprise a transducer coupled directly to an active deflecting medium. A beam of electromagnetic radiation, such as light, is deflected by electrically exciting the transducer, which launches acoustic wave energy into the deflecting medium, and, simultaneously, directing the beam through the medium at the Bragg angle with respect to the acoustic wavefronts. Under these conditions one portion of the beam is deflected while the remaining portion passes through the medium essentially unaffected. In considering the operation of this deflector, both the angle of deflection and the intensity of the deflected portion are relevant.

It is found that the angle through which the beam is deflected is approximately inversely proportional to the wavelength of the acoustic wave energy in the deflecting medium or directly proportional to the frequency at which the medium is excited. In particular, if the acoustic wavelength U is much greater than the wavelength of the beam W, which is true when the radiation is light, a portion of the beam entering the deflecting medium at an angle $$\frac{1}{2}\frac{U}{W}$$

to the acoustic wavefronts is deflected through an angle $U/W$. Thus, changing the frequency at which the transducer is excited changes the angle through which the beam is deflected.

As previously noted, only a portion of the beam is deflected. In particular, the ratio of the deflected portion to the undeflected portion is found to be proportional to the intensity of the acoustic excitation in the medium. Thus, increasing the intensity of the acoustic excitation increases the intensity of the deflected portion.

One limitation that has arisen in the development of ultrasonic deflectors is their relative inefficiency. Typically, such devices have a high insertion loss. Thus, a relatively large amount of input power is required to deflect a significant proportion of the entering light beam.

SUMMARY OF THE INVENTION

The present invention is directed to arrangements for producing more efficient digital light deflection. In a light deflector in accordance with the present invention, the acoustic energy is coupled to the deflecting medium through a multimode acoustic resonator located between the transducer and the deflecting medium. It has been found that when the transducer is driven at one of the resonant frequencies of the resonator, the coupling between the transducer and the deflecting medium is greatly enhanced. Thus, the presence of the resonator results in the deflection of a larger proportion of the incident light beam for the same amount of electrical input power. Moreover, since the resonant frequencies of the transducer are equally spaced, and since the angle of deflection is proportional to the frequency of the acoustic energy, each of the resonant frequencies corresponds to one of a series of equally spaced address points located at an optical wave receiver.

BRIEF DESCRIPTION OF THE DRAWINGS

The above-mentioned and other objects and features of the invention will be more readily understood from the following discussion, taken in conjunction with the accompanying drawings in which.

DETAILED DESCRIPTION

Figure 1:
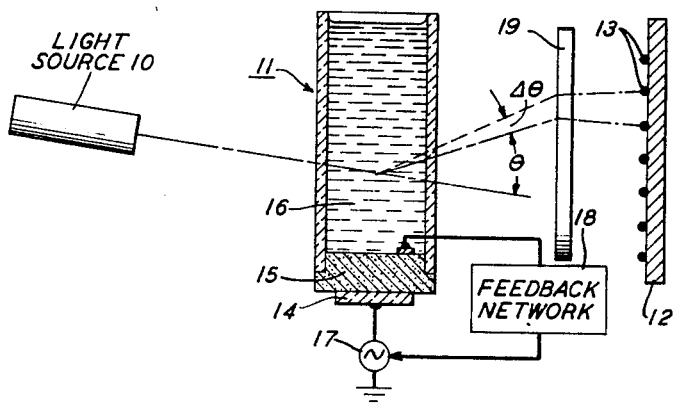
FIG. 1 is a schematic drawing of an illustrative embodiment of a one-dimensional digital deflecting system in accordance with the invention.
Figure 2:
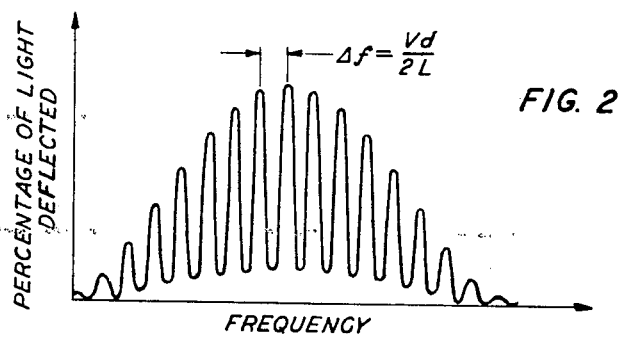
FIG. 2, included for purposes of illustration, shows the percentage of light deflected as a function of frequency.

In FIG. 1, which is an illustrative embodiment of a digital deflecting system in accordance with the invention, there is shown a source 10 of electromagnetic radiation such as an optical maser, an ultrasonic deflector 11, which is described in greater detail hereinbelow, and a receiver 12 having appropriately spaced electromagnetic responsive addresses 13. In an optical system the latter can comprise an array of photodiodes or other light-sensitive elements. Source 10, deflector 11 and receiver 12 are aligned such that electromagnetic radiation from the source, entering the deflector at the Bragg angle with respect to acoustic waves propagating therein, is deflected and falls upon the receiver.

The ultrasonic deflector 11 comprises, in essence, a thickness mode transducer 14 coupled to an ultrasonic resonator 15 which, in turn, is coupled to a deflecting medium 16. A variable frequency oscillator 17 is used to drive transducer 14 at a chosen one of the resonance frequencies of resonator 15 and, advantageously, a feedback arrangement 18 is used to electronically lock the frequency of oscillator 17 to the selected one of the resonances of the resonator.

The thickness-mode transducer 14 is, advantageously, capable of operating over a band of high frequencies.

One example of such a transducer is a fundamental mode X-cut bonded quartz transducer.

Resonator 15, which is bonded to transducer 14 along one side, and is in contact with deflecting medium 16 along the opposite side, is characterized by a length L therebetween, and a phase velocity $V_d$. Advantageously, resonator 15 has flat and parallel sides, and is many wavelengths long. Fused silica was found to be a material from which a suitable resonator can be made for use in accordance with the invention.

The deflecting medium is both supportive of ultrasonic waves and, at the same time, transparent to radiation from source 10. It is characterized by an ultrasonic phase velocity $V_a$ and, advantageously, has an ultrasonic impedance that is substantially different from that of the resonator. Typically, the impedance of the deflecting medium is three or four times that of the resonator. Water, for example, is a suitable medium for use in conjunction with a fused silica resonator to deflect a 6328 Angstrom beam from a He-Ne laser.

In operation, variable frequency oscillator 17 and the feedback arrangement 18 are used to drive transducer 14 at a preselected resonance frequency. At the same time, a beam of radiation is directed by source 10 upon the deflecting medium 16 at the Bragg angle. The driven transducer excites large amplitude acoustic standing waves in resonator 15, which, in turn, couple acoustic energy into the deflecting medium. It is found that the intensity of acoustic energy in the deflecting medium is significantly enhanced by the presence of the resonator and, as a consequence, a larger portion of the incident beam is deflected.

Since the angle at which the beam is deflected is proportional to the acoustic frequency, and since the resonance frequencies of the resonator are equally spaced, efficient digital deflection can be obtained for a plurality of equally spaced deflection angles. In particular, it can be shown that the resonance frequencies are separated by frequency increments of $V_d/2L$ and the deflection angles produced by these resonance frequencies are separated by angular increments of approximately $$\frac{W}{2L}\frac{V_d}{V_a}\text{radians}$$

Since the frequency increment between adjacent resonance frequencies is inversely proportional to the length L of the resonator, increasing the length of the resonator increases the number of resonance frequencies, and hence the number of discrete deflection angles through which efficient beam deflection occurs is increased. Thus, by the proper choice of L, a deflector capable of deflecting a beam through a particular number of equally spaced deflection angles can be realized.

Alternatively, in applications where it is important that paralel rather than angular deflections be produced, a collimating lens 19 can be placed between the deflector and the receiver. The lens transforms the series of equally spaced deflection angles into a series of equally spaced parallel displacements.

Experiments, using water as the deflecting medium, fused silica as the resonator material, and a quartz transducer, have indicated that the resulting deflector is up to 10 times more efficient than ultrasonic deflectors which do not employ a resonator in accordance with the principles of the invention.

In these experiments it was also found that other advantages accrue from the use of an acoustical resonator in accordance with the invention. In particular, it was observed that the use of a resonator increases the useful bandwidth of the transducer. This result, attributed to the more efficient coupling of acoustic energy between the transducer and deflecting medium, permits the use of transducers having more favorable electrical properties than those used in prior light deflectors. When the transducer is coupled directly to the deflecting medium, a transducer made from an intrinsically broadband material such as, for example, potassium sodium niobate, is typically required to achieve a practical range of deflection angles. Intrinsically broadband materials, however, generally have unfavorable electrical properties such as large dielectric constants and a high level of dielectric loss. On the other hand, it is found that by placing a resonator between the transducer and the deflecting medium, the acoustical coupling is so enhanced that a transducer made from a relatively narrow band material, such as quartz, and having more favorable electrical properties, can be employed. The resonator effectively broadens the transducer bandwidth by producing more efficient coupling of acoustic energy into the medium at frequencies where the transducer intensity would normally be much too small to be directly coupled into the medium.

Figure 3:
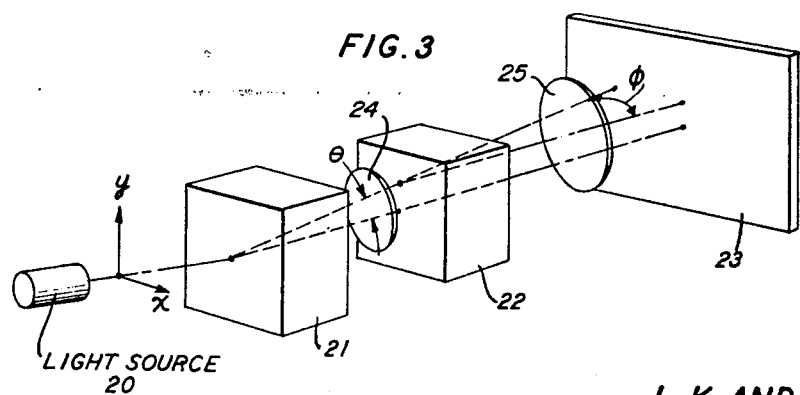
FIG. 3 is a schematic drawing of a two-dimensional digital deflecting system in accordance with the invention.

In FIG. 3 there is shown a schematic drawing of a two-dimensional digital deflecting system in accordance with the invention. The two-dimensional system differs from the previously described one-dimensional system chiefly in that two digital deflectors 21 and 22 are utilized rather than a single deflector. The two deflectors are substantially the same as the one previously described in connection with the embodiment of FIG. 1. However, in order to produce a two-dimensional deflection, they are so oriented that they deflect in two mutually perpendicular directions. In the particular embodiment of FIG. 3, deflector 21 deflects in the Y direction, whereas deflector 22 deflects in the X direction. In addition to the second deflector, the system also differs in that a two-dimensional receiver 23 is utilized rather than a one-dimensional receiver. Receiver 23 is characterized by responsive addresses at points corresponding to the equiangular deflections of the two deflectors.

In operation, a beam from source 20 in incident upon the first deflector 21 which produces deflection in the Y direction. The deflected beam then passes through the second deflector 22 which produces angular deflection in the X direction. As previously described, the discrete angle of deflection in each deflector can be determined by applying an appropriate oscillator signal to the deflector and, in this embodiment, the signals applied to each of the two deflectors define the point upon receiver 23 at which the beam impinges. Alternatively, appropriately spaced collimating lenses 24 and 25 and a receiver having a rectangular grid of responsive addresses can be used. Since each of the two deflectors may be 10 times more efficient than the corresponding prior art devices, the resulting two-dimensional deflecting system may be 100 times more efficient than corresponding prior art two-dimensional systems.

In all cases, the above-described arrangements are merely illustrative of a small number of the many possible specific embodiments which can represent applications of the principles of the invention. Thus numerous and varied other arrangements can be readily devised in accordance with these principles by those skilled in the art without departing from the spirit and scope of the invention.

What is claimed is:

1. An ultrasonic electromagnetic radiation deflector comprising:

a deflecting medium supportive of acoustic waves and substantially transparent to said electromagnetic radiation;

an ultrasonic resonator, characterized by a plurality of equally spaced resonance frequencies, coupled to said deflecting medium;

a transducer for coupling acoustic waves into said resonator;

and means for selectively exciting said transducer at different selected ones of said resonance frequencies.

2. An ultrasonic electromagnetic radiation deflector in accordance with claim 1 including:
   a source of electromagnetic radiation for directing a beam of radiation onto said deflector;
   and means for receiving the portion of said beam deflected by said deflector.

3. An ultrasonic deflector in accordance with claim 2 including means for collimating said deflected portion of said beam located between said deflector and said receiving means.

4. A one-dimensional ultrasonic electromagnetic radiation deflecting system comprising:
   a first medium supportive of ultrasonic waves having an ultrasonic phase velocity $V_a$ and transparent to said electromagnetic radiation;
   an ultrasonic resonator of length L having an ultrasonic phase velocity $V_d$ coupled to said first medium;
   a transducer for coupling an acoustic wave into said resonator;
   variable frequency means for energizing said transducer at frequencies corresponding to the resonant frequencies of said resonator;
   a source of electromagnetic radiation of wavelength W, including means for directing a beam of said radiation upon said first medium;
   and means for receiving the deflected portion of said beam characterized by adjacent radiation responsive addresses whose locations correspond to deflection angles equal to integral multiples of $$\frac{W}{2L}\frac{V_d}{V_a}$$

5. A two-dimensional digital electromagnetic radiation deflecting system comprising:
   two ultrasonic electromagnetic radiation deflectors in accordance with claim 1 oriented to produce deflection in two mutually perpendicular directions;
   a source of electromagnetic radiation, including means for directing a beam of radiation onto said deflectors;
   and means for receiving the portion of said beam deflected by said deflectors.

6. A deflecting system in accordance with claim 5 including means for collimating said deflected portion of said beam.

References Cited

"An Ultrasonic Light Deflection System," by A. Korkel et al., IEEE Journal of Quantum Electronics, April 1965.

"Application of Ultrasonic Standing Waves to the Generation of Optical-Beam Scanning," by H. G. Aas et al., Journal of Acoustical Soc. of Amer., vol. 35, No. 10, October 1961.

RONALD L. WIBERT, Primary Examiner

P. K. GODWIN, Assistant Examiner

U.S. Cl. X.R.

178—7.6; 250—199